…

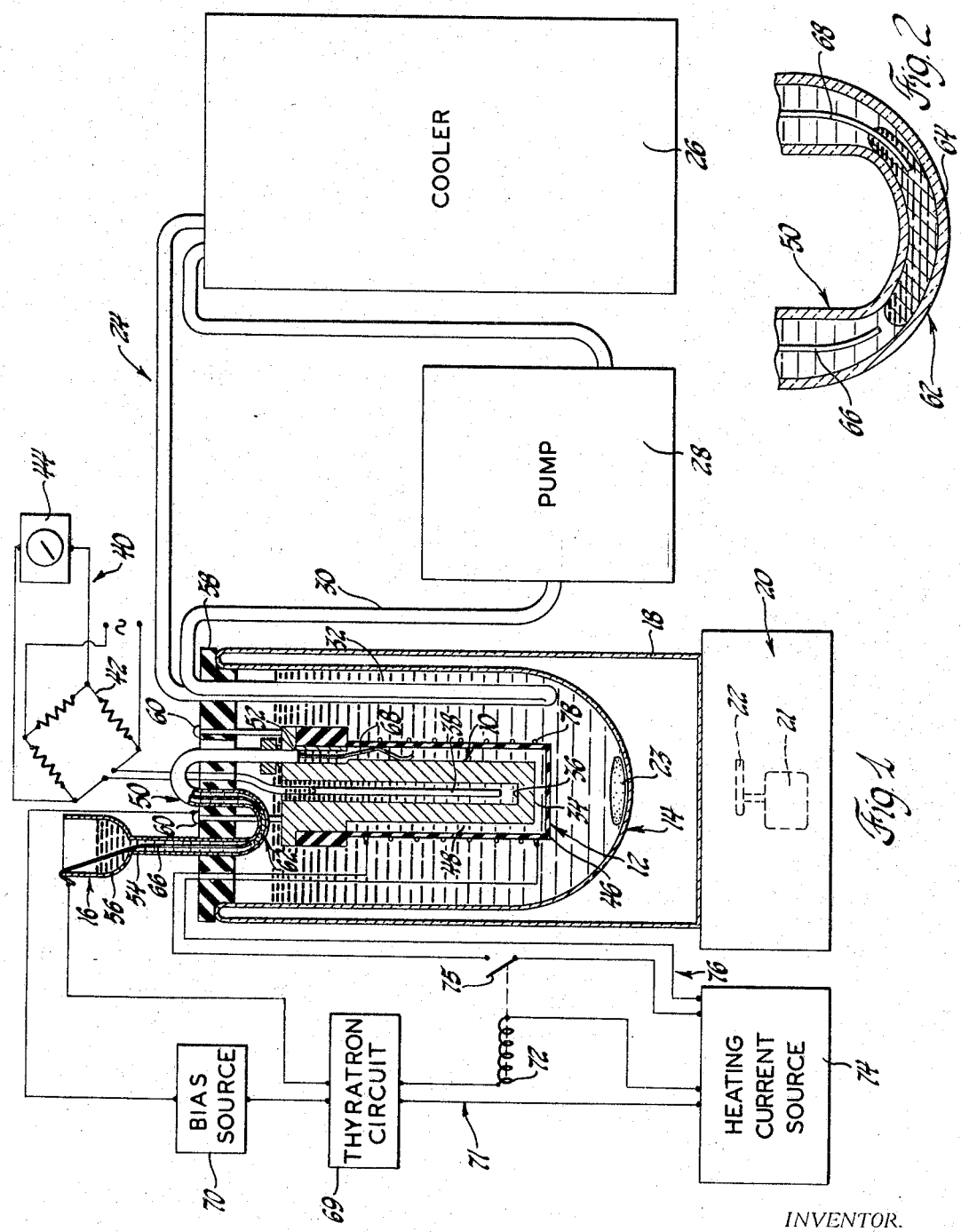

United States Patent Office 3,323,578
Patented June 6, 1967

3,323,578
METHOD AND APPARATUS FOR CONTROLLING TEMPERATURES
Donald W. Hermann, Milwaukee, Wis., assignor to General Motors Corporation, Detroit, Mich., a corporation of Delaware
Filed Dec. 11, 1964, Ser. No. 417,746
14 Claims. (Cl. 165—2)

This invention relates to improved method and apparatus for controlling temperatures and is adapted, although not exclusively, for controlling the temperature of a bath.

The customary way of controlling the temperature of a bath is to surround it with a cooling medium whose temperature is controlled as accurately as possible. Despite the accuracy of the control, the cooling medium will have temperature fluctuations and these inherently influence the temperature of the bath. If the object is to maintain the bath temperature constant, these fluctuations of the cooling medium render it virtually impossible. Consequently, if the bath is, e.g., being used to calibrate thermometers, then of course the accuracy of the thermometers can only be maintained within a range determined by these fluctuations. This necessitates a compromise in their accuracy.

It is, therefore, proposed to overcome this problem and others with new and different method and apparatus whereby a controlled temperature zone is interposed between a cooling medium and a bath whose temperature is to be controlled. This allows the cooling medium temperatures to fluctuate without concern for their influence on the bath temperatures.

The invention also contemplates apparatus that, in effect, isolates a bath whose temperature is to be controlled from an unregulated cooling medium.

The invention further contemplates a unique control for monitoring temperatures of a medium.

The foregoing and other objects and advantages of the invention will become apparent from the following description and the accompanying drawings, in which:

FIGURE 1 is a schematic diagram of a system incorporating the principles of the invention; and FIGURE 2 is an enlarged fragmentary sectional view of a switch employed by the system.

Referring now to FIGURE 1 for the details of the invention, the numeral 10 denotes generally a primary or main bath whose temperature is to be accurately controlled. This primary bath 10 is surrounded by a secondary or controlled bath, denoted generally at 12. These two baths 10 and 12 are positioned within a cooling or uncontrolled temperature bath 14. Only the temperature of the secondary bath 12 is controlled by a temperature control viewed generally at 16, so that, and as will be explained, the temperature of the main bath 10 is maintained constant.

Considering first the details of the cooling bath 14, the preferred cooling medium is ethyl alcohol and this is contained within an appropriate vacuum flask 18. Other cooling mediums cuold be used as will occur to those versed in the art. The cooling medium is agitated by a conventional magnetic stirrer illustrated at 20. The magnetic stirrer 20 may be of the type commercially available from the Fisher Scientific Company of Chicago, Ill., and referred to as the Jumbo Magnetic Stirrer, Model 14–511–75B2. Briefly, the magnetic stirrer 20 utilizes a variable speed motor 21 to rotate a permanent magnet 22 which is arranged opposite a stirrer 23. The stirrer 23 is also permanently magnetized. Free movement of the stirrer 23 within the flask 18 is facilitated by encasing it within a suitable material, such as Teflon. Hence, as the motor 21 rotates the permanent magnet 22, the stirrer 23 will be continuously reorientated with respect to the magnet 22 and develop the necessary agitation to keep the ethyl alcohol within the flask 18 from developing different temperatures zones.

The cooling medium is kept cooler than the primary bath by a suitable cooling system, designated generally at 24. This cooling system 24 includes a cooler 26 which contains some kind of a suitable coolant, such as Dry Ice or liquid nitrogen. A variable speed pump 28 is used to circulate an appropriate circulating coolant, such as ethyl alcohol, through piping 30. The part of the piping 30 within the cooler 26 is preferably formed in a spiral to gain a greater exposure area, while the part within the flask 18 is formed in a U shape at 32, with the vertical legs thereof affording entrance and exit paths for the circulating coolant. The speed of the pump 28 and its operating cycle are so selected that the cooling medium within the flask 18 is maintained cooler than the primary bath 10 only, i.e., the temperature of the cooling medium within the flask 18 can fluctuate considerably as long as its mean temperature is cooler than that of the bath. Hence, there need not be any accurate control of the temperature of the cooling medium; it merely has to be cooled below the temperature of the primary bath 10.

In some applications, the cooling system 24 may be eliminated. This would require appropriate insulation for the flask 18 and the addition of Dry Ice or the like to the cooling medium.

The primary bath 10 in this embodiment comprises a block 34, preferably of copper, having an elongated well 36 defined by relatively thick walls. With the body 34 formed of copper these relatively thick walls not only serve as a highly conductive heat sink but also cause the temperature of the well 36 to respond slowly to fluctuations in the temperature of the cooling medium. The well 36 is opened at its upper end so that ethyl alcohol will fill it. This ethyl alcohol within the well 36 will have its temperature maintained constant, as will be further explained.

Any type of device that is to be calibrated can be placed in the well 36, e.g., the bath is useful in calibrating platinum wire thermometers. The usual platinum wire thermometer, such as that shown diagrammatically at 38, is formed of spiral shaped fine platinum wire and has its resistance calibrated to have a certain proportional relationship to the temperature of the environment that the thermometer is monitoring. To calibrate the thermometer 38 its leads are connected preferably to a suitable readout device denoted generally at 40. The readout device 40 can comprise a bridge circuit 42, wth the thermometer 38 connected to one of the legs. The calibration of the bridge 42 is such that any suitable gauge 44 can be connected to the output of the bridge 42 and sense any unbalance that would occur due to a thermometer 38 being out of calibration. The dial of the gauge 44, of course, can provide a visual indication of the amount of the error.

One way to effect this calibration is to install a standard or reference thermometer in the well 36 and then determine the actual temperature of the bath. The gauge 44 is appropriately adjusted so that now the thermometer 38 can be installed and checked.

The secondary or controlled bath 12 employs a can 46, preferably also of copper, that is centrally located with respect to the body 34 of the primary bath 10 and spaced therefrom so as to permit a sensing or regulating fluid, which also can be ethyl alcohol, to be within a space 48 provided between the inside of the can 46 and the outside of the body 34. At the upper end of the can 46, through a suitable seal, is secured to the body 34. The central relative locations of the can 46 and the body 34 preclude the possibility of hot and cold areas within the space 48.

The temperature control 16 senses the temperature of the regulating fluid through a U-tube 50 that has its lower end 52 sealingly connected to the space 48 and its upper end 54 communicating with a reservoir 56. A seal cap 58 for the top of the flask 18 also serves as a support for the body 34 and the can 46, this being accomplished by rods 60 made of copper or some similar conductive material. The U-tube 50 is, in turn, supported by the body 34.

The U-tube 50 performs somewhat as a thermometer in sensing the temperature of the regulating fluid through the utilization of a mercury switch 62. The mercury switch 62, which comprises a movable slug of mercury 64 (see FIGURE 2) and a pair of spaced contact wires 66 and 68, is a part of a conventional switching circuit, such as a thyratron circuit, identified by the numeral 69. When the regulating fluid within the space 48 is heated, it will expand and force the mercury slug 64 to a position in which it bridges the contact wires 66 and 68 to connect the thyratron circuit 69 to an appropriate bias source 70. The circuit for the bias source 70 extends from the thyratron circuit 69 through the contact wire 66, the mercury slug 64, the contact wire 68, the body 34 of the primary bath 10, the copper pin 60, and back to the thyratron circuit 69 by way of the bias source 70. When the latter circuit is completed by the closure of the mercury switch 62, the thyratron will fire and complete a relay circuit, denoted generally at 71. Other types of switches can, of course, be employed in place of the thyratron circuit 69. On the other hand, when the regulating fluid cools, it will contract and the mercury slug 64 will move to its illustrated position in FIGURE 2, interrupting the connection between the two contact wires 66 and 68.

If it is desirable to change the temperature or control point at which the well 36 operates, the regulating fluid can be allowed to leak past the mercury slug 64 by allowing the cooling medium in the uncontrolled temperature bath 14 to cool or warm until the well 36 is at the desired temperature. A standard or reference thermometer can be used to monitor this temperature. When the temperature within the well 36 changes, the mercury slug 64 will rise into the corresponding larger area end of the U-tube 50. Consequently, the regulating fluid will leak past the mercury raising or lowering the control point, determined by whether the regulating fluid is leaked past the mercury slug 64 to the reservoir 56 or from the reservoir.

Since the volume of the regulating fluid within the space 48 determines this control point, other ways of altering the volume can be used, as will readily occur to those versed in the art. For example, a manually operable valve (not shown) can be used to bypass the mercury slug 64 and either decrease or increase the amount of regulating fluid within the space 48. Then too, a bellows, a plunger, or the equivalent, can be used to move the regulating fluid from or to the reservoir 56.

If preferred, only mercury can be used both to serve the switch function and the temperature sensing function. Therefore, the mercury would become the regulating fluid.

As illustrated in FIGURE 1, the relay circuit 71 comprises a relay coil 72 which is in series with, in this embodiment, a heating current source 74 adjusted to provide the appropriate voltage for energizing the relay coil 72. If preferred, a separate source, for instance a battery, can be used. The relay coil 72 operates a pair of normally closed relay contacts 75 arranged in a heater circuit, denoted generally at 76.

The switch 62 presents a resistance that must be controlled by the selection of proper parameters in order to obtain the desired operation of the relay circuit 71. A drop of oil in the proximity of the contact wire 66 and the mercury slug 64 has been found effective for this purpose. The heating circuit 76 utilizes a heating coil 78 that surrounds the exterior of the can 46 and that derives its heating current from the source 74, as previously mentioned, when the contacts 75 are closed. The voltage derived from the source 74 is preferably adjustable.

Considering now the operation of the apparatus, it will be assumed that a thermometer 38 is in the well 36; and that the circulating system 24 has been operative long enough to cool the cooling medium within the flask 18 to a temperature below that at which the thermometer well 36 is to be maintained. If the temperature of the regulating fluid within the space 48 is higher than some predetermined set temperature, which will be that necessary to obtain the correct constant temperature within the thermometer well 36, the mercury switch 64 will close. This is because the mercury slug 64 will be moved into engagement with both contact wires 66 and 68 due to the expansion of the regulating fluid. The closing of the mercury switch 62 will cause the proper voltage to be applied by the bias source 70 to the thyratron circuit 69; hence, the thyratron will fire and complete the relay circuit 71. This will cause the relay coil 72 to be energized and the relay contacts 75 in the heating circuit 76 to be opened. This removes the heat and allows the regulating fluid to cool until it contracts sufficiently to cause the mercury switch 62 to open. With the mercury switch 62 open, the relay circuit 71 will correspondingly be opened and the relay winding 72 deenergized. Now the relay contacts 75 will return to their normally closed position and the heating circuit 76 will be completed. The heating coil 78 will be supplied with current and again heat the regulating fluid. This sequence of events will continue to happen as variations in regulating fluid within the space 48 occur; i.e., the regulating fluid will be either heated or allowed to cool so as to maintain the desired constant temperature within the thermometer well 36.

As will now be understood, the temperature of the cooling medium within the flask 18 must be cooler than that desired for the thermometer well 36 in order to cool the regulating fluid, but the cooling medium temperature does not have to be controlled. Once the temperature of the thermometer well 36 is stabilized at that desired, fluctuations in the temperature of the regulating fluid within the space 48 will be corrected before they can be transferred through the relatively thick walls of the body 34, and therefore influence the temperature of the thermometer well 36. The agitation of the cooling medium is not great enough to influence the static condition of that in the well 36. Also, the temperature gradient presented at the top of the well 36 prevents any perceptible influencing of the well temperature. Isolation, of course, by an appropriate cap is possible, if needed.

From the foregoing it will be appreciated that a constant temperature can be maintained within the primary bath 10 with an uncontrolled temperature bath 14 by interposing therebetween a controlled temperature bath 12. The controlled temperature bath 12 not only is used to maintain the temperature of the thermometer well 36 constant, but serves as a buffer zone that prevents fluctuations in the temperature of the cooling medium from being transferred to the thermometer well 36. Further facilitating this is the use of an insulating type wall that has a low coefficient of thermal conductivity.

It should be understood that the novel principle also contemplates the use of an uncontrolled temperature bath 14 with a higher temperature than that wanted within the well 36. This is easily accomplished by replacing the heating coil 78 with a cooling coil. Conventional and well known apparatus can be used for this cooling.

The invention is to be limited only by the following claims.

What is claimed is:

1. Temperature controlling apparatus comprising, in combination, a primary bath whose temperature is to be controlled, a secondary bath surrounding the primary, an uncontrolled bath arranged to have the secondary bath therein and containing a cooling medium that is cooler than the primary bath, and means controlling the temperature of the secondary bath both so as to control the temperature of the primary bath and so as to render the primary bath uninfluenced by temperature fluctuations of the cooling medium.

2. Temperature controlling apparatus comprising, in combination, a primary bath whose temperature is to be controlled, a secondary bath surrounding the primary bath, an uncontrolled bath arranged to have the secondary bath therein and containing a cooling medium for the secondary bath, the cooling medium being cooler than the primary bath, and means controlling the temperature of the secondary bath both so as to control the temperature of the primary bath and so as to render the primary bath uninfluenced by temperature fluctuations of the cooling medium, the controlling means including heating means operative to heat the secondary bath and means sensing the temperature of the secondary bath and operable to render the heating means operative when the temperature of the secondary bath is below a predetermined value.

3. Temperature controlling apparatus comprising, in combination, a primary bath whose temperature is to be maintained at a certain relatively constant value, a secondary bath surrounding the primary bath, an uncontrolled bath arranged to have the secondary bath therein and containing a cooling medium for the secondary bath, the cooling medium having a mean temperature of a predetermined amount less than the certain value of the primary bath temperature, and means controlling the temperature of the secondary bath both so as to maintain the primary bath temperature at the certain value and so as to render the primary bath uninfluenced by the temperature fluctuations of the cooling medium, the controlling means including heating means operative to heat the secondary bath and means sensing the temperature of the secondary bath and operable to render the heating means operative when the temperature of the secondary bath is below a predetermined value.

4. Temperature controlling apparatus comprising, in combination, a primary bath whose temperature is to be maintained in a certain relatively constant value, a secondary bath surrounding the primary bath, an uncontrolled bath arranged to have the secondary bath therein and containing a cooling medium for the secondary bath, the cooling medium being cooler than the primary bath, and means controlling the temperature of the secondary bath both so as to maintain the primary bath temperature at the certain value and so as to render the primary bath uninfluenced by temperature fluctuations in the cooling medium, the controlling means including a heater associated with the secondary bath, a source of heating current, and switch means operative in response to the temperature of the secondary bath to connect the source to the heater when the temperature of the secondary bath is below a predetermined value.

5. Temperature controlling apparatus comprising a primary bath whose temperature is to be maintained at a certain relatively constant value, a secondary bath surrounding the primary bath and including a regulating fluid, an uncontrolled bath arranged to have the secondary bath therein and containing a cooling medium for the secondary bath, the cooling medium being cooler than the primary bath, and means controlling the temperature of the secondary bath both so as to maintain the primary bath temperature at the certain value and so as to render the primary bath uninfluenced by fluctuations in the temperature of the cooling medium, the controlling means including a heater operative to heat the secondary bath, and means sensitive to the temperature of the regulating fluid and adapted when the temperature of the regulating fluid is below a predetermined value to render the heater operative.

6. Temperature controlling apparatus comprising, in combination, a primary bath whose temperature is to be maintained at a relatively constant value, a secondary bath surrounding the primary bath and including a regulating fluid, an uncontrolled bath having the secondary bath submerged therein, the uncontrolled bath being cooler than the primary bath, and means controlling the temperature of the secondary bath so as to maintain the primary bath temperature at the certain value and so as to render the primary bath temperature uninfluenced by the fluctuations in the temperature of the uncontrolled bath, the controlling means including a heating coil associated with the secondary bath, a source of heating current, and switch means operable in response to changes in temperature of the regulating fluid to connect the source to the heating coil when the temperature of the regulating fluid is below a predetermined value.

7. Temperature controlling apparatus comprising, in combination, a primary bath whose temperature is to be maintained at a certain constant value, the primary bath having a container provided with walls of a conductive material, a secondary bath centrally locating the primary bath therein, the secondary bath including a container provided with a regulating fluid in which the primary bath is emerged, an uncontrolled bath containing a cooling medium that is cooler than the primary bath and that substantially surrounds the secondary bath, means controlling the temperature of the secondary bath both so as to maintain the primary bath temperature at the certain constant value and so as to render the primary bath relatively uninfluenced by fluctuations in temperature of the cooling medium, the controlling means including a source of heating current, a heating coil surrounding the secondary bath, switch means responsive to the temperature of the regulating fluid, the switch means including a pair of contacts and a column of mercury so arranged as to be responsive to the temperature of the regulating fluid and in response thereto to make or break the connection between the switch contacts so as to cause the heating coil to be connected to the source when the temperature of the regulating fluid is below a predetermined value.

8. The method of controlling the temperature of a primary bath comprising the steps of providing a cooling medium of a variable temperature that is less than the temperature at which the primary bath is to be maintained and interposing a controlled temperature bath between the primary bath and the cooling medium so as to render the primary bath uninfluenced by the fluctuations in the temperature of the cooling medium while maintaining the primary bath temperature relatively constant.

9. The method of controlling the temperature of a primary bath comprising the steps of providing an uncontrolled bath with a cooling medium of a variable temperature less than the temperature at which the bath is to be maintained, interposing between the two baths a controlled bath with a regulating fluid, and maintaining the regulating fluid at a relatively constant temperature so as to both maintain the temperature of the primary bath at a desired value and so as to render the temperature of the primary bath uninfluenced by fluctuations in the temperature of the cooling medium.

10. The method of controlling the temperature of a primary bath comprising the steps of providing an uncontrolled bath with a cooling medium of a variable temperature that has a mean value less than the temperature at which the primary bath is to be maintained, interposing between the uncontrolled bath and the primary bath a controlled bath containing a regulating fluid, sensing the temperature of the regulating fluid, and supplying a heating current to the regulated fluid when the temperature is less than the value needed to maintain the temperature of the primary bath at a desired value.

11. The method of controlling the temperature of a primary bath comprising the steps of providing a temperature varying medium of a variable temperature that is different from the temperature at which the primary bath is to be maintained and interposing a controlled temperature bath between the primary bath and the medium so as to render the primary bath uninfluenced by the fluctuations in the temperature of the medium while maintaining the primary bath temperature relatively constant.

12. The method of controlling the temperature of a primary bath comprising the steps of providing an uncontrolled bath with a temperature varying medium of a variable temperature different from the temperature at which the bath is to be maintained, interposing between the two baths a controlled bath with a regulating fluid, and maintaining the regulating fluid at a relatively constant temperature so as to both maintain the temperature of the primary bath at a desired value and so as to render the temperature of the primary bath uninfluenced by fluctuations in the temperature of the temperature varying medium.

13. Temperature controlling apparatus comprising, in combination, a primary bath whose temperature is to be controlled, a secondary bath surrounding the primary, an uncontrolled bath arranged to have the secondary bath therein and containing a medium that has a temperature different from the primary bath, and means controlling the temperature of the secondary bath both so as to control the temperature of the primary bath and so as to render the primary bath uninfluenced by temperature fluctuations of the medium.

14. Temperature controlling apparatus comprising, in combination, a primary bath whose temperature is to be controlled, a secondary bath surrounding the primary bath, an uncontrolled bath arranged to have the secondary bath therein and containing a temperature varying medium of a different temperature from the primary bath, and means controlling the temperature of the secondary bath both so as to control the temperature of the primary bath and so as to render the primary bath uninfluenced by temperature fluctuations of the temperature varying medium, the controlling means including temperature varying means operative to change the temperature of the secondary bath and means sensing the temperature of the secondary bath and operable to render the temperature varying means operative when the temperature of the secondary bath is different from a predetermined value.

References Cited
UNITED STATES PATENTS 2,232,998    2/1941    Cernohouz et al.    165—26
2,338,691    1/1944    Tucker    165—104

ROBERT A. O'LEARY, *Primary Examiner*.

CHARLES SUKALO, *Examiner*.